US007598889B2

United States Patent
Maeda et al.

(10) Patent No.: US 7,598,889 B2
(45) Date of Patent: Oct. 6, 2009

(54) DRIVING INFORMATION ANALYSIS APPARATUS AND DRIVING INFORMATION ANALYSIS SYSTEM

(75) Inventors: Munenori Maeda, Kobe (JP); Tetsuya Uetani, Kobe (JP); Junichi Sawada, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 309 days.

(21) Appl. No.: 11/598,756

(22) Filed: Nov. 14, 2006

(65) Prior Publication Data
US 2007/0122771 A1 May 31, 2007

(30) Foreign Application Priority Data
Nov. 14, 2005 (JP) .............................. P2005-329525

(51) Int. Cl.
*G08G 1/123* (2006.01)
(52) U.S. Cl. .................. 340/995.27; 340/439; 340/990; 701/36; 701/200; 701/301
(58) Field of Classification Search ................ 340/990, 340/439, 735, 995.1, 995.12, 995.14–995.26, 340/995.28, 996, 435, 475, 903, 995.27, 340/995.11, 995.13; 701/36, 200, 301; 180/169, 180/271
See application file for complete search history.

(56) References Cited

U.S. PATENT DOCUMENTS

| | | | | |
|---|---|---|---|---|
| 5,884,216 A | * | 3/1999 | Shah et al. | 701/207 |
| 6,014,081 A | * | 1/2000 | Kojima et al. | 340/576 |
| 6,181,996 B1 | * | 1/2001 | Chou et al. | 701/36 |
| 6,438,472 B1 | * | 8/2002 | Tano et al. | 701/35 |
| 6,593,960 B1 | * | 7/2003 | Sugimoto et al. | 348/148 |
| 6,982,635 B2 | * | 1/2006 | Obradovich | 340/439 |

FOREIGN PATENT DOCUMENTS

| | | |
|---|---|---|
| JP | A 5-45171 | 2/1993 |
| JP | A 7-333011 | 12/1995 |
| JP | 10-332409 | * 12/1998 |
| JP | A 10-332409 | 12/1998 |
| JP | A 2004-102426 | 4/2004 |

* cited by examiner

*Primary Examiner*—Benjamin C Lee
*Assistant Examiner*—Daniel Previl
(74) *Attorney, Agent, or Firm*—Harness, Dickey & Pierce, P.L.C.

(57) ABSTRACT

A driving information analysis apparatus which serves well to assist drivers' safe driving with the ease of checking analysis results is provided. Based on driving information read by a CF card reader, a vehicle mark is displayed on a map to indicate position information of a vehicle when an event occurs. Simultaneously with the vehicle mark, a surrounding image of the vehicle corresponding to the position information is displayed on a display section. Such displays favorably help analyze what situation occurs where.

11 Claims, 17 Drawing Sheets

OFFICE SIDE

MOBILE STATION SIDE

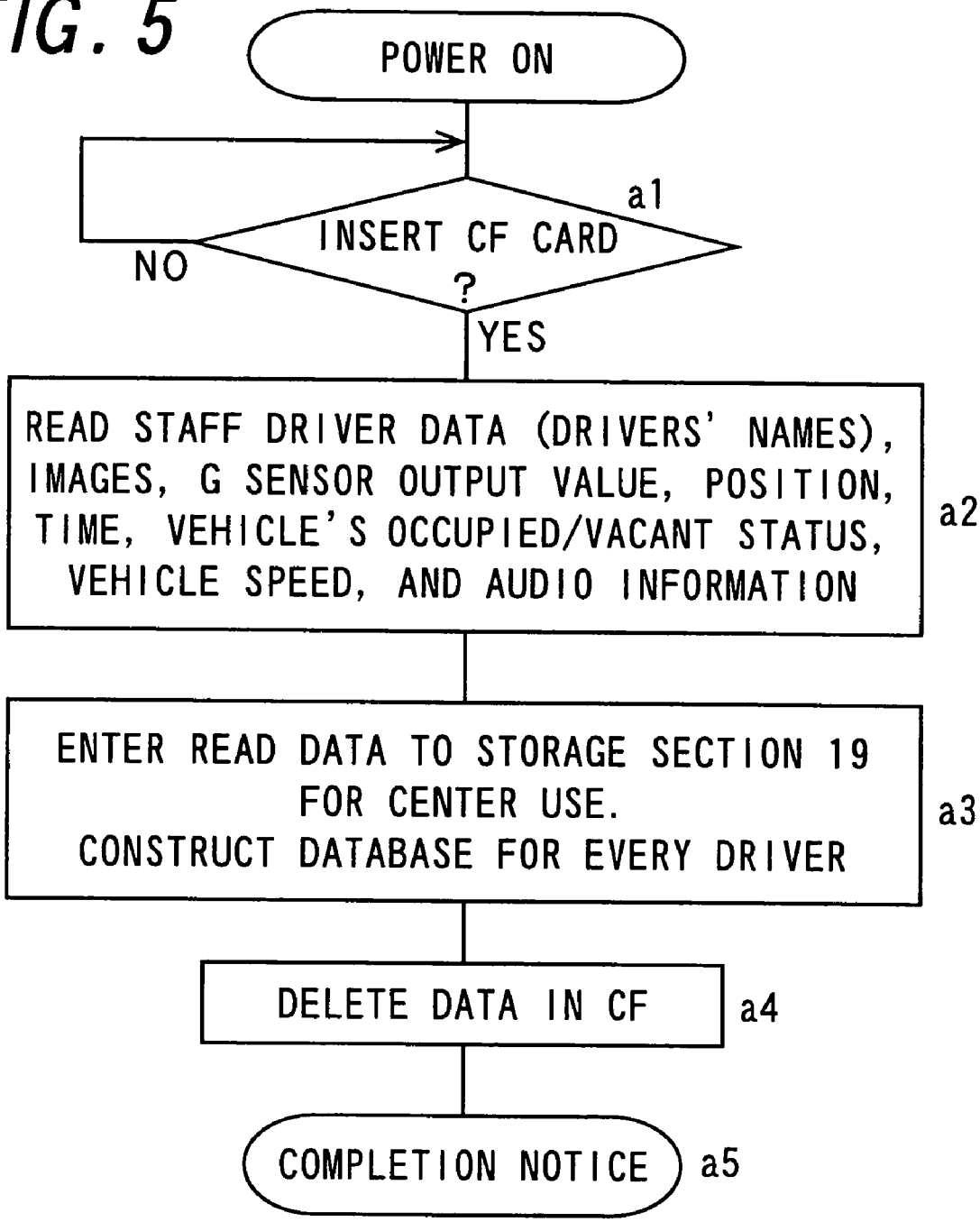

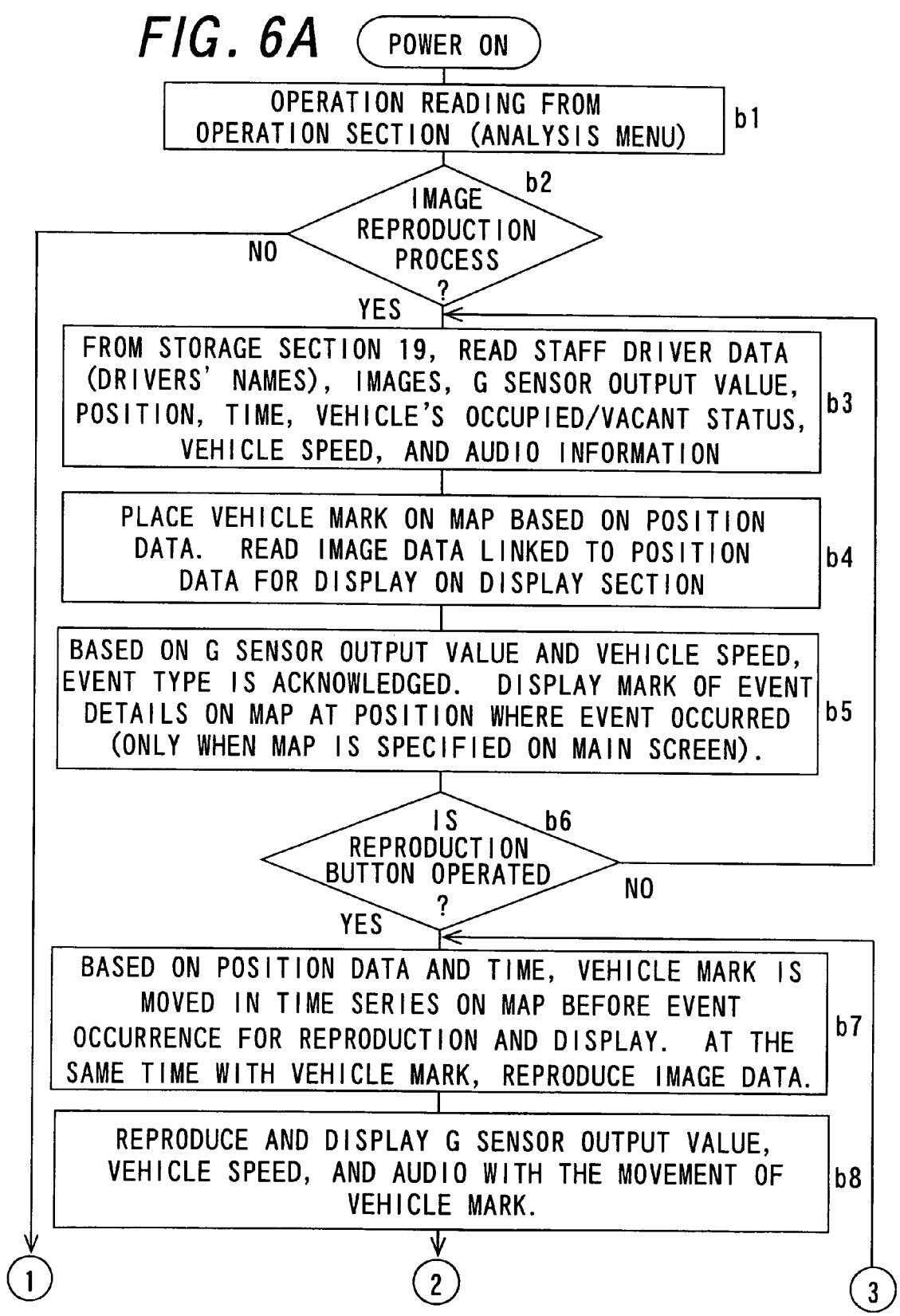

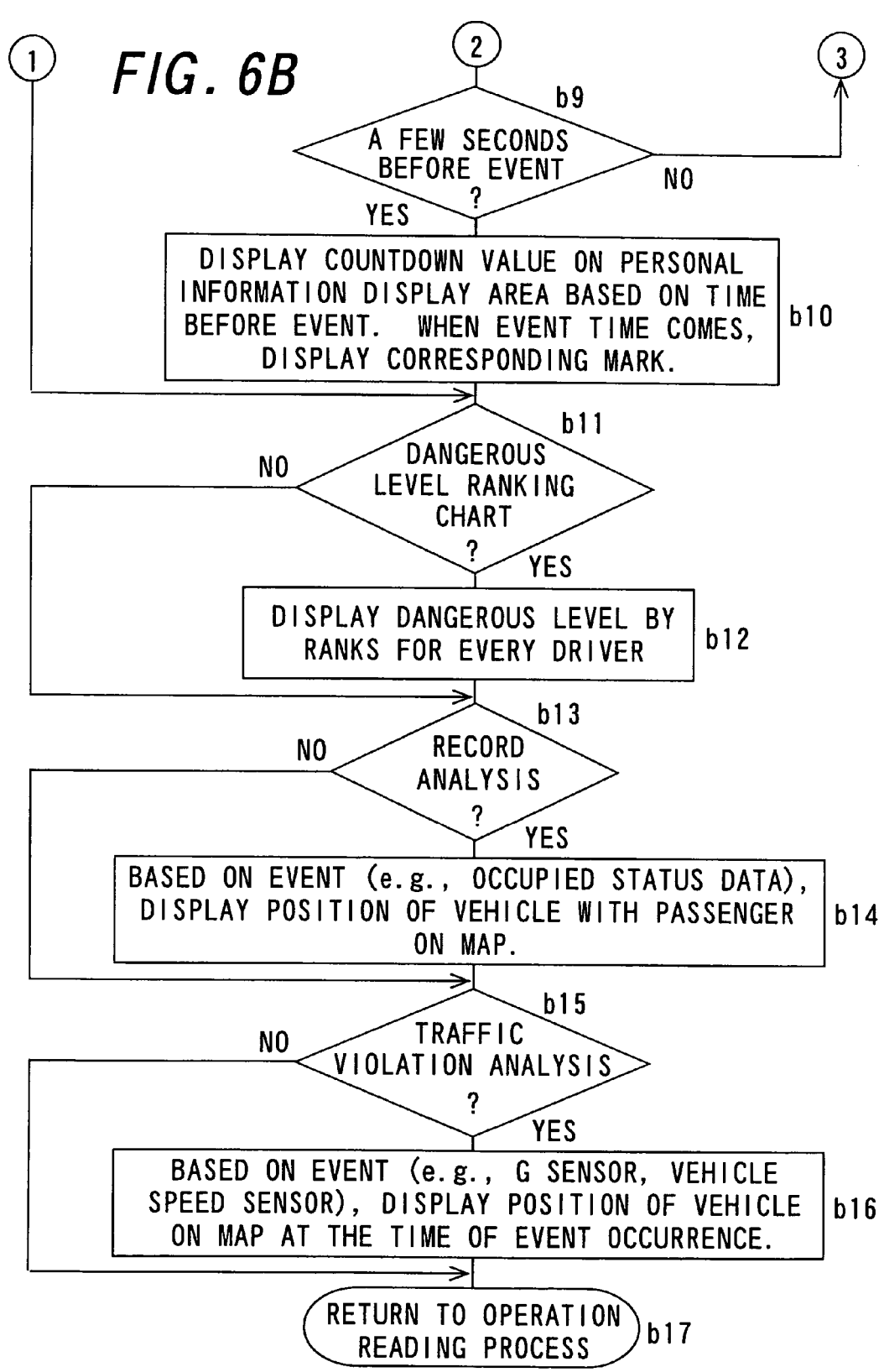

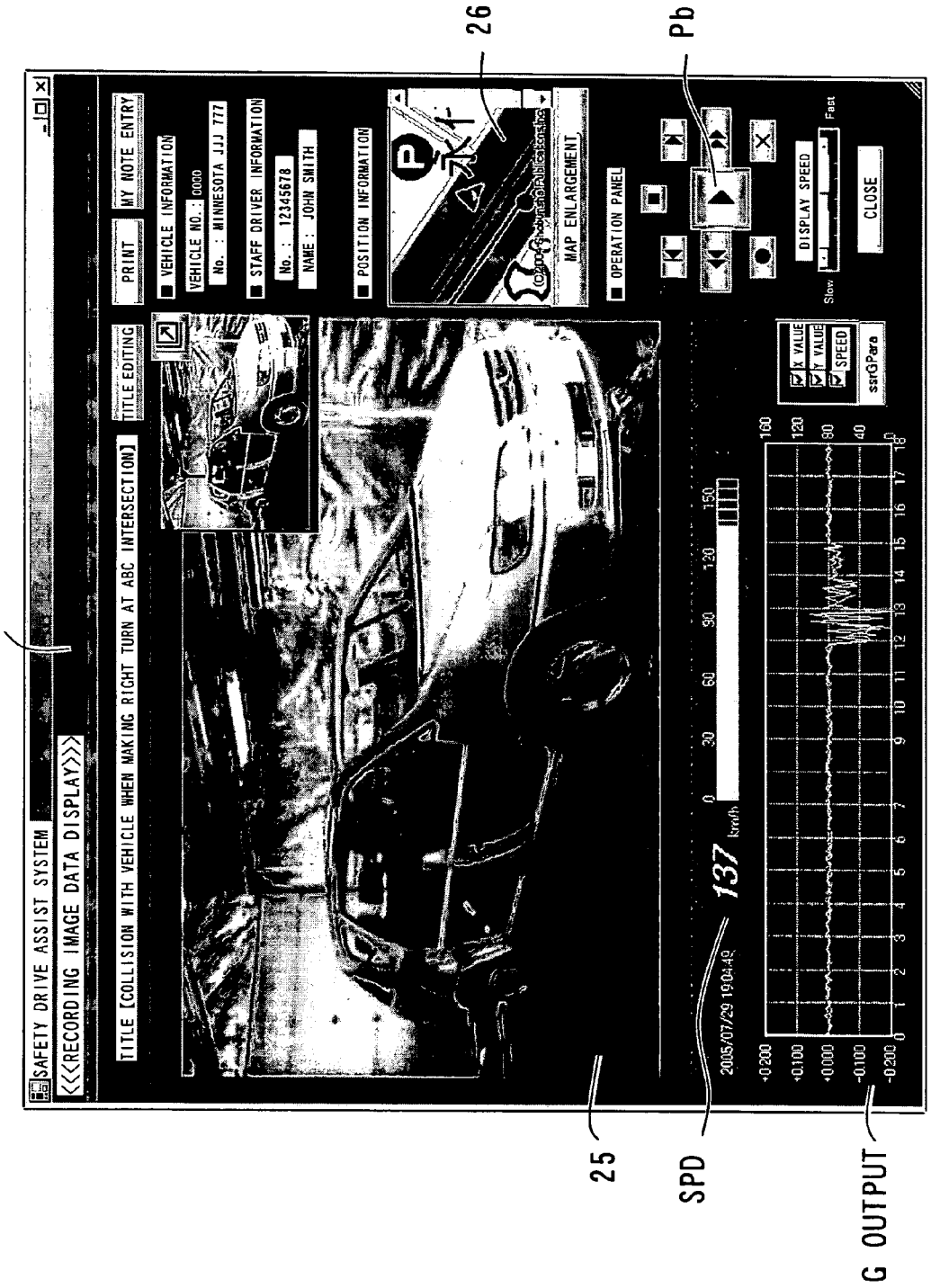

FIG. 9

STAFF DRIVER ASSIST SYSTEM

DANGEROUS LEVEL RANKING CHART <TOTAL EVALUATION>

| TOTAL | ALL HOURS | EARLY-MORNING AND LATE-NIGHT | BUSY HOURS | TRAFFIC JAM HOURS | AFTER-DINNER HOURS | OTHER HOURS |

EXTRACTION TARGET DATE AUGUST 2005

[OVERSPEED] → 5 SCORES
[ABRUPT ACCELERATION] → 5 SCORES
[HARSH BRAKING] → 5 SCORES
[ABRUPT STEERING] → 5 SCORES
[G DETECTION] → 30 SCORES

■ EXTRACTION ORDER SETTING
10  EXTRACTION UP TO TOP-RANKED 10

WORST RANKING DISPLAY | BEST RANKING DISPLAY | PRINT RANKING CHART

■ RANK AS THE WORST 10 DRIVERS

| RANK | DRIVER NAME | DANGEROUS SCORES | FREQUENCY | DRIVING TENDENCIES |
|---|---|---|---|---|
| 1 | A | 1010 | 62 | TENDENCIES OF OVERSPEED |
| 2 | B | 775 | 65 | TENDENCIES OF OVERSPEED |
| 3 | C | 575 | 55 | TENDENCIES OF OVERSPEED |
| 4 | D | 535 | 72 | TENDENCIES OF OVERSPEED |
| 5 | E | 430 | 26 | TENDENCIES OF OVERSPEED |
| 6 | F | 410 | 47 | TENDENCIES OF OVERSPEED |
| 7 | G | 390 | 43 | TENDENCIES OF OVERSPEED (※G DETECTION = ONCE) |
| 8 | H | 185 | 22 | TENDENCIES OF OVERSPEED |
| 9 | I | 175 | 15 | TENDENCIES OF OVERSPEED |
| 10 | J | 165 | 28 | TENDENCIES OF OVERSPEED |

CLOSE

20

[TRAFFIC-VIOLATION-PRONE AREA ANALYSIS]

FIG. 12

TIME RANGE SETTING

<<<TIME RANGE SETTING>>>

POSSIBLE TO CHANGE TIME RANGE SETTING. ENTER "TITLE" AND "REASON", AND SELECT TARGET "TIME"

SETTING ITEM 1  TITLE [EARLY-MORNING AND LATE-NIGHT] (UP TO 8 LETTERS)   REASON [DROWSINESS EARLY-MORNING AND LATE-NIGHT] (UP TO 20 LETTERS)   SCORES [0.01]
TIME RANGE  6 7 8 9 10 11 12 13 14 15 16 17 18 19 20 21 22 23 0 1 2 3 4 5

SETTING ITEM 2  TITLE [BUSY HOURS] (UP TO 8 LETTERS)   REASON [FATIGUE DUE TO BUSY WORK AND REDUCED CONCENTRATION] (UP TO 20 LETTERS)   SCORES [0.05]
TIME RANGE  6 7 8 9 10 11 12 13 14 15 16 17 18 19 20 21 22 23 0 1 2 3 4 5

SETTING ITEM 3  TITLE [TRAFFIC JAM HOURS] (UP TO 8 LETTERS)   REASON [IRRITATED BY MANY CARS AROUND] (UP TO 20 LETTERS)   SCORES [0.20]
TIME RANGE  6 7 8 9 10 11 12 13 14 15 16 17 18 19 20 21 22 23 0 1 2 3 4 5

SETTING ITEM 4  TITLE [AFTER-DINNER HOURS] (UP TO 8 LETTERS)   REASON [FILLED WITH DINNER AND FELT DROWSY] (UP TO 20 LETTERS)   SCORES [0.30]
TIME RANGE  6 7 8 9 10 11 12 13 14 15 16 17 18 19 20 21 22 23 0 1 2 3 4 5

SETTING ITEM 5  TITLE [OTHER HOURS] (UP TO 8 LETTERS)   REASON [OTHER REASONS] (UP TO 20 LETTERS)   SCORES [0.70]
TIME RANGE  6 7 8 9 10 11 12 13 14 15 16 17 18 19 20 21 22 23 0 1 2 3 4 5

RESET     SETTING   CLOSE

US 7,598,889 B2

DRIVING INFORMATION ANALYSIS APPARATUS AND DRIVING INFORMATION ANALYSIS SYSTEM

BACKGROUND OF THE INVENTION

1. Field of the Invention

The present invention relates to a driving information analysis apparatus and a driving information analysis system and, for example, to a technology that can teach and assist drivers to drive.

2. Description of the Related Art

Conventionally, a taxi dispatching system has been put to practical use in which a digital radio transmitter-receiver using a band of 400 MHz, for example, is adopted to increase the data communication volume so as to enhance the accuracy with which information on vehicles' positions and operation modes is collected. According to this taxi dispatching system, since the collection accuracy of information on vehicles' positions and the like is enhanced, the improvement in working efficiency of people in charge of dispatching taxies and taxi drivers can be attempted to be realized while attempting to satisfy demands from taxi users.

As described in Japanese Unexamined Patent Publications JP-A 2004-102426 and JP-A 7-333011 (1995) and Japanese Examined Patent Publication JP-B2 3285597, for example, a manager is expected to teach his or her staff drivers to drive, and make efforts to improve services for taxi users. JP-A 2004-102426 discloses a traffic accident recording video analysis system that is capable of analyzing information about the vehicle's amount of movement with high accuracy based on a distortion correction image. JP-A 7-333011 discloses a vehicle driving schedule record analysis apparatus of calculating a distance between starting and ending points set in analyzing data based on time-series speed data in storage, and displaying a graph of speed corresponding to the calculated distance. JP-B2 3285597 discloses a navigation apparatus that reproduces previously-captured images corresponding to the current position of a driving vehicle.

In JP-A 2004-102426 and JP-A 7-333011, however, there is no specific description of situation before and after an event, and there is no clue about the relationship between position information and images captured before and after the event. This thus considerably increases the amount of recording information that does not necessarily require analysis, and results in a difficulty in reserving the recording capacity for future use. In JP-B2 3285597, the navigation apparatus can indeed reproduce and display images in accordance with the current position of the vehicle. The apparatus, however, has the problem of not being able to perform analysis when any event occurs, for example.

SUMMARY OF THE INVENTION

An object of the invention is to provide a driving information analysis apparatus and a driving information analysis system, which serve well to assist drivers' safe driving with the ease of checking the analysis results.

The invention provides a driving information analysis apparatus that reads, from a recording medium, driving information covering a period before and after occurrence of an event, and analyzes the driving information, the driving information analysis apparatus comprising:

a control unit that makes a display section display, based on the driving information read by a reading unit that reads the driving information recorded in the recording medium, a vehicle mark on a map to indicate vehicle position information at a time of occurrence of the event, and display, simultaneously with the vehicle mark, a vehicle surrounding image corresponding to the position information.

Further, the invention provides a driving information analysis apparatus that reads, from a recording medium, driving information covering a period before and after occurrence of an event, and analyzes the driving information, the driving information analysis apparatus comprising:

a reading unit that reads the driving information recorded in the recording medium;

a display section that display various pieces of information thereon;

a storage section that stores map information and the driving information therein; and a control unit that makes the display section display, based on the driving information, a vehicle mark on a map to indicate vehicle position information at a time of occurrence of the event, and display, simultaneously with the vehicle mark, a vehicle surrounding image corresponding to the position information.

According to the invention, based on the driving information read by the reading unit, the display section displays the vehicle mark on the map to indicate the vehicle position information at the time of occurrence of the event, and simultaneously with the vehicle mark, displays the vehicle surrounding image corresponding to the position information. Such displays favorably help analyze what situation occurs where, so that the analysis results can be easily checked. As such, the driving information analysis apparatus can serve well to assist drivers' safe driving.

Further, in the invention, it is preferable that the control unit makes the display section display, on the map, details of the event corresponding to the position information at a time of occurrence of the event.

According to the invention, the details of the event are displayed on the map corresponding to the position information at the time of occurrence of the event. This accordingly eases to understand what situation occurs where, so that the analysis can be performed with more ease.

Further, in the invention, it is preferable that the control unit makes the display section simultaneously display a main screen and a sub screen which is smaller than the main screen, wherein the main screen displays the vehicle mark, and the sub screen displays, on the map, details of the event corresponding to the position information together with the vehicle surrounding image.

According to the invention, the vehicle mark is displayed on the main screen, and when the vehicle surrounding image is displayed on the sub screen, the details of the event corresponding to the position information are also displayed on the map. This allows to display large the map on the main screen, thereby making portions segmented for every event details easy to see, and increasing the efficiency of a rendering process.

Further, in the invention, it is preferable that, based on the driving information covering the period before and after the occurrence of the event, the control unit makes the display section display the vehicle mark on the map in the period before and after the occurrence of the event, and the vehicle surrounding image simultaneously with the vehicle mark.

According to the invention, based on the driving information covering the period before and after the occurrence of the event, the vehicle mark is displayed on the map for the period before and after the occurrence of the event, and the vehicle surrounding image is also displayed simultaneously with the vehicle mark. This helps analyze in detail the situation before and after the occurrence of the event.

Further, in the invention, it is preferable that the control unit makes the display section display a countdown display before the occurrence of the event.

According to the invention, the display section is made to display the countdown display before the occurrence of the event. It is thus possible to recognize that the event will occur after a predetermined time. At a predetermined time before a point of time when the event will occur, the screen is switched from the normal display to the countdown display. The analysis can be thus performed with the easy-to-see display with no need to always reserve in advance a space for the countdown display.

Further, in the invention it is preferable that, based on dangerous driving information and driver information included in the driving information, the control unit makes the display section display details of the dangerous driving information, which are frequently caused by each driver.

According to the invention, for each of the drivers, the dangerous driving information which is one of the events is read from the recording medium, and the details of the dangerous driving information are displayed to show driving tendencies. This enables to teach and guide the drivers to stop driving dangerously as they tend to do, thereby serving well to assist drivers' safe driving.

Further, in the invention, it is preferable that the control unit makes the display section display, on the map, driver's with-passenger information included in the driving information, corresponding to the position information.

According to the invention, the driving information, i.e., the driver's with-passenger information which is one of the events, is displayed on the map corresponding to the position information. This accordingly helps a manager perform vehicle allocation with efficiency. What is more, the driver-oriented vehicle allocation, i.e., for a specific area, a driver familiar with the area is allocated with a priority, will make the driver feel easy to drive so that he or she will stop driving dangerously. As such, the driving information analysis apparatus can serve well to assist drivers' safe driving.

Further, in the invention, it is preferable that the control unit makes the display section display, on the map, details of the dangerous driving information included in the driving information, corresponding to the position information.

According to the invention, the driving information, i.e., the details of the dangerous driving information which is one of the events, is displayed on the map corresponding to the position information. The drivers thus can drive while making a detour to avoid the position or being cautious at the position, or be taught and guided to do so.

Further, in the invention, it is preferable that the control unit makes the display section display the dangerous driving information or the with-passenger information only for a predetermined time range.

According to the invention, the dangerous driving information or the with-passenger information can be displayed only for a predetermined time range, thereby helping understand how often the dangerous driving information appears in the time range.

The invention provides a driving information analysis system that reads, from a recording medium, driving information covering a period before and after occurrence of an event, and analyzes the driving information, the driving information analysis system comprising:

a computer including an input unit, a computation unit, and an output unit, wherein the computer is made to function as an element that makes a display section display, based on the driving information read by a reading unit that reads the driving information recorded in the recording medium, a vehicle mark on a map to indicate vehicle position information at a time of occurrence of the event, and display, simultaneously with the vehicle mark, a vehicle surrounding image corresponding to the position information.

According to the invention, the computer is made to function as the element that makes the display section display the vehicle mark on a map to indicate vehicle position information when an event occurs, and display, simultaneously with the vehicle mark, the vehicle surrounding image corresponding to the position information. Such displays favorably help analyze what situation occurs where, so that the analysis results can be easily checked. Such a computer-implemented driving information analysis system can serve well to assist drivers' safe driving.

BRIEF DESCRIPTION OF THE DRAWINGS

Other and further objects, features, and advantages of the invention will be more explicit from the following detailed description taken with reference to the drawings wherein:

FIG. 1A is a schematic diagram showing the configuration of the driving information analysis apparatus on a side of a center, and FIG. 1B is a schematic diagram showing the configuration of a driving information analysis apparatus on a side of a mobile station;

FIG. 5 is a flowchart showing a PC data reading process from the CF card;

FIGS. 6A and 6B are flowcharts showing an analysis process of the control section;

FIGS. 7A and 7B are diagrams showing an image data reproduction screen, and specifically, FIG. 7A is a diagram showing both a main screen and a sub screen simultaneously, and FIG. 7B is a diagram showing, corresponding to the position information at the time of event occurrence, the countdown display together with the details of the event on a map;

FIG. 9 is a diagram showing a screen of the dangerous level ranking chart;

FIG. 12 is a diagram showing a time range setting screen;

DETAILED DESCRIPTION

Figure 1A:
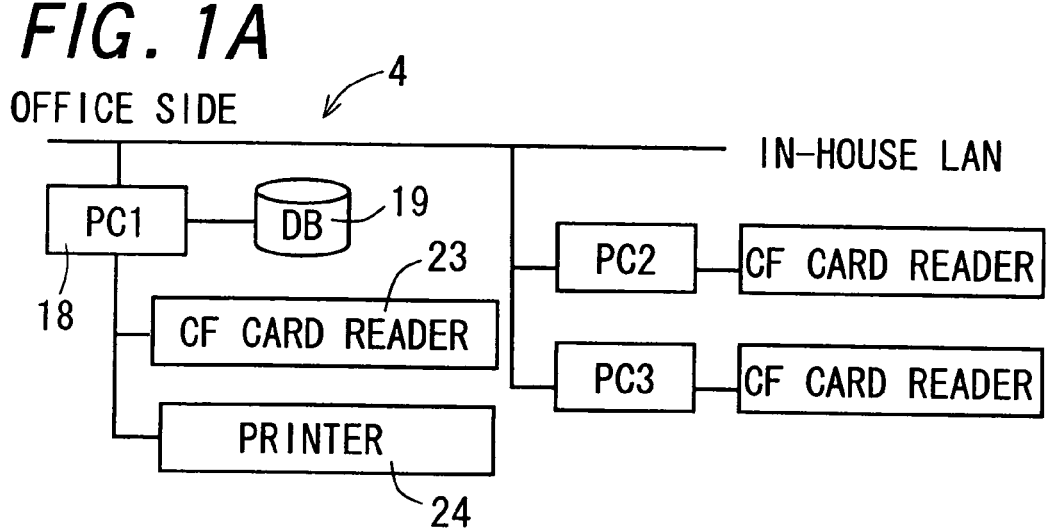
FIGS. 1A and 1B are schematic diagrams showing the configuration of a drive assist system according to an embodiment of the invention, and specifically.

Now referring to the drawings, preferred embodiments of the invention are described below.

Figure 1B:
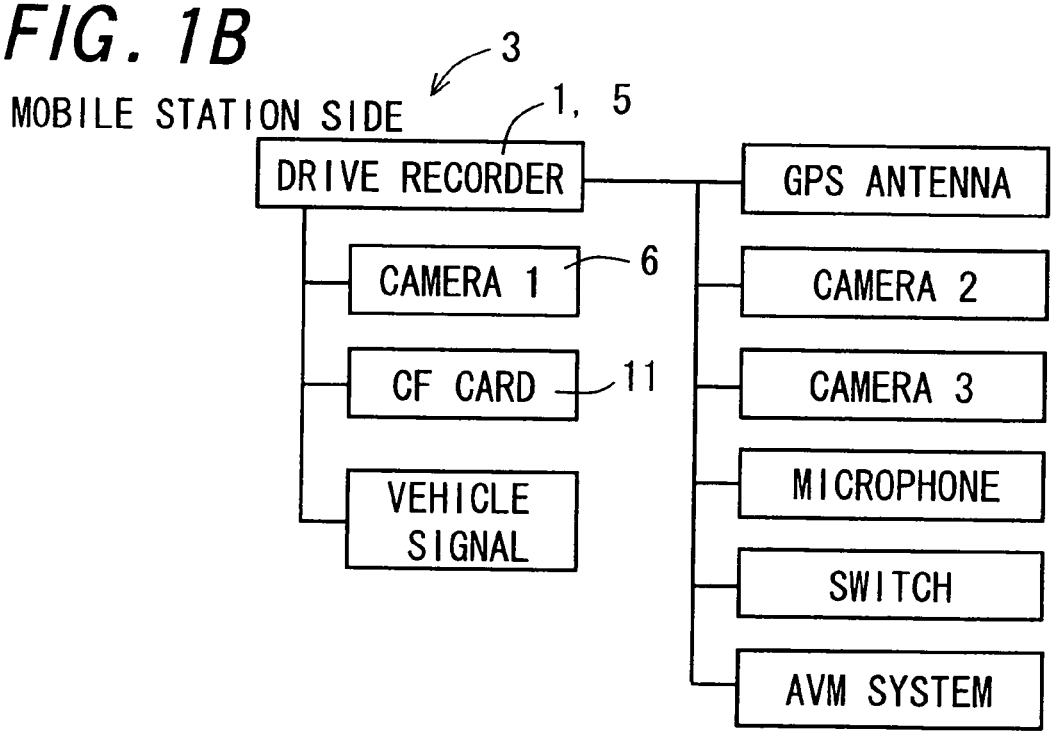
Figure 2:
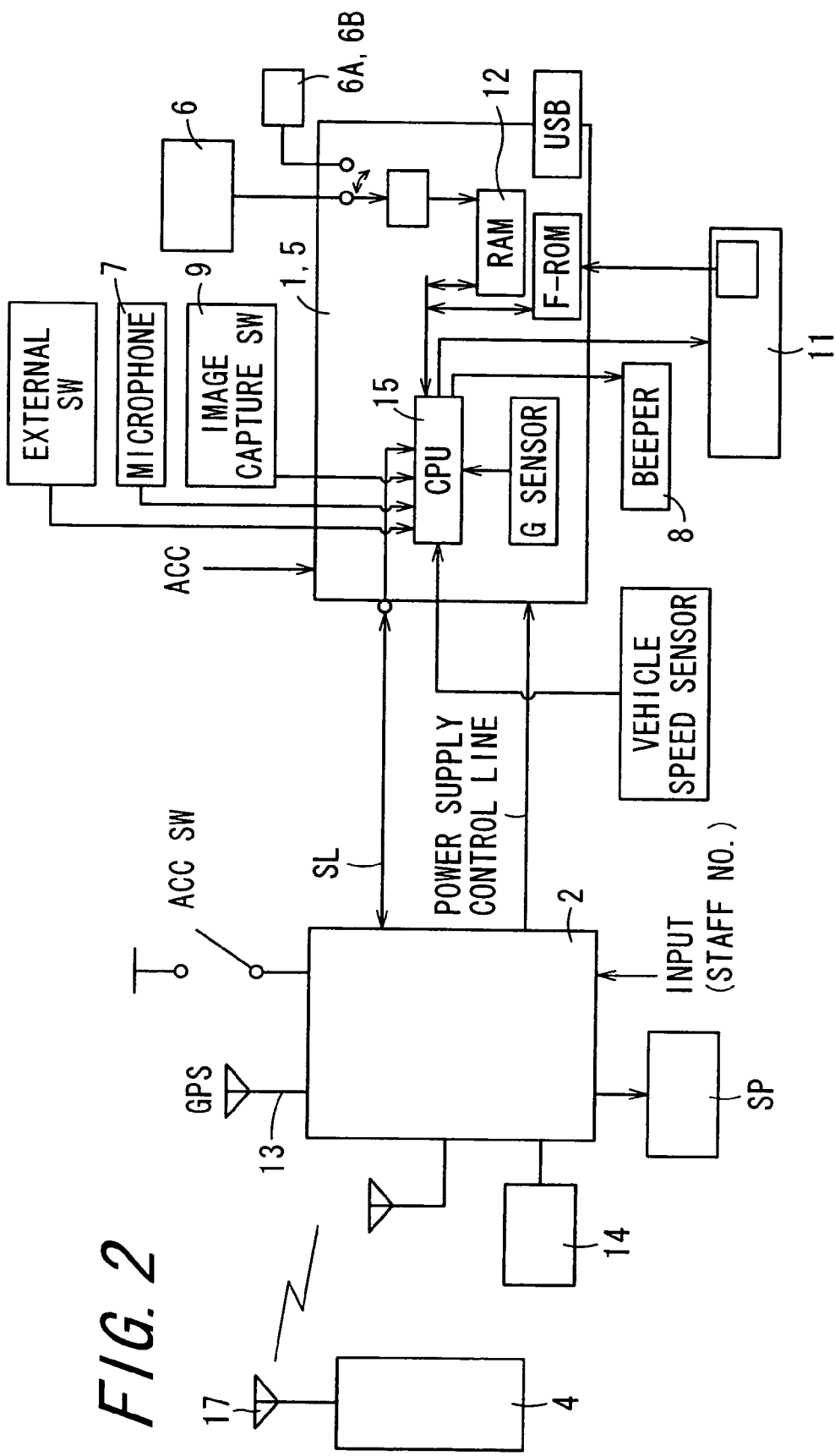
FIG. 2 is a block diagram showing the electronic configuration of a drive recorder, a control device, and a center device.

FIGS. 1A and 1B are schematic diagrams showing the configuration of a drive assist system of an embodiment of the invention. Specifically, FIG. 1A is a schematic diagram showing the configuration of the driving information analysis apparatus on the side of a center, and FIG. 1B is a schematic diagram showing the configuration of a driving information analysis apparatus on the side of a mobile station. FIG. 2 is a block diagram showing the electronic configuration of a drive recorder 1, a control device 2, and a center device 4. The drive assist system (referred also to as staff driver assist system) of the embodiment includes a driving information analysis apparatus (referred also to as driving information analysis system) on the side of an office (the center), and the drive recorder 1 on the side of the mobile station.

In the embodiment, the control device 2 (sometimes referred to as AVM-ECU 2) equipped in a vehicle 3 for driving schedule control is electrically connected with the drive recorder 1. With a digital radio frequency of 400 MHz, for example, the control device 2 can transmit information about the vehicle 3 to the center device 4 serving as a driving information analysis apparatus. The information includes the position of the vehicle 3, the movement and behavior thereof, and the time. Based on such information, the center device 4 is so configured as to issue a vehicle allocation command to the vehicle 3, i.e., a specific vehicle out of a plurality of those. With the above radio frequency or others, the center device 4 makes an image capture request for the drive recorder 1 via the control device 2. Note here that the radio frequency for use is not necessarily restrictive to 400 MHz, and sometimes the frequency range assigned to mobile phones is used, for example. The digital radio frequency is not the only option, and analog radio frequency will also do.

The drive recorder 1 is designed not only to record information on the position, time and operation mode of the vehicle 3 which are sent from the control unit 2 but also to record image and audio information in relation to the information or the like in the event that a predetermined condition is met. The center equipment is configured so as to analyze and output these pieces of information recorded in the drive recorder 1.

The drive recorder 1 has a drive recorder main body 5, a camera 6 serving as a photographing unit, a microphone 7 for acquiring audio information inside a passenger compartment, and a buzzer 8 serving as an information output unit, for sending warning information. The camera 6 and the microphone 7 are provided separately from the drive recorder main body 5 in such a manner as to be electrically connected thereto, and the buzzer 8 is provided integrally with the drive recorder main body 5. At least one camera 6 is provided on the vehicle 3. The camera 6 is made up of a CCD camera (CCD: Charge Coupled Device). This camera 6 is affixed to, for example, a position on a windscreen 3a which corresponds to the back of an inside rearview mirror via a bracket, not shown, so as to photograph a forward direction of the vehicle. Namely, this camera 6 is fixed in place in such a manner as to be directed towards the front of the vehicle. In the drive recorder 1, a second or a third camera 6 can be provided on the vehicle 3, and specifically speaking, a photographing camera 6A within a passenger compartment of the vehicle or a photographing camera 6B for photographing the rear view behind the vehicle. There may also occur a case where a photographing switch 9 for activating these cameras 6 is provided separately from the drive recorder main body 5 in such a manner as to be electrically connected thereto. In addition, a drive recorder 1 can be applied to the vehicle in which a GPS (Global Positioning System) antenna 10, a GPS receiver, not shown, and the like are added to the drive recorder main body 5.

The drive recorder main body 5 is configured to receive therein a CF card 11 (CF: Compact Flash) which is designed to be inserted into and removed from the drive recorder main body 5. This CF card 11 is configured into a single card integrating a flash memory which does not lose its memory without energization, with a controller circuit which is responsible for input from and output to an external apparatus. Driving information including images on the periphery of the vehicle, audio information from the microphone inside the passenger compartment, position, individual, time and vehicle's occupied/vacant status information is recorded sequentially and endlessly in a primary RAM12 (RAM: Random Access Memory), which will be described later on, of the drive recorder main body 5. At least part of the information is recorded in the CF card 11 in the event that a predetermined condition is met.

In the embodiment, the control device 2 is provided with a GPS receiver and a GPS antenna 13. Alternatively, the drive recorder main body 5 may be provided with the GPS receiver and the GPS antenna. Position information and time information are acquired by the GPS antenna 13 and the GPS receiver, and the staff driver data can be provided by an LCD (Liquid Crystal Display) operator. Vehicle's occupied/vacant status information is acquired from a driver-operable vehicle's occupied/vacant status indicator meter 14 serving as a vehicle's occupied/vacant status operation unit. The vehicle's occupied/vacant status indicator meter 14 is provided with a switch that is actuated by the driver's operation. The switch is operated to be switched to an occupied state indicating side by the driver when he or she conforms a destination with a passenger who enters the passenger compartment of the vehicle. When the vehicle arrives at the destination, the switch is operated to be switched to a vacant state indicating side by the driver, and then, a fare to be paid by the passenger is determined.

Such information including the position information, the time information, the staff driver data, and the vehicle's occupied/vacant status information is stored in a second RAM of the control device for a temporary basis. When a request comes from the center device 4 for information transmission via the digital radio, the information stored in the second RAM is forwarded to the center device 4 via the digital radio. Alternatively, the control device 2 may voluntarily forwards such information to the center device 4. Upon reception of a vehicle allocation request from the center device 4 via the digital radio, the control device 2 may make such a notification to the driver via a speaker SP. The control device 2 forwards thus received information, i.e., the position information, the time information, the staff driver data, and the vehicle's occupied/vacant status information, to the drive recorder 1 via the driver. Such information transmission is made over a serial communications line SL. The drive recorder 1 receives such information via a first communications driver for storage into a second SD-RAM being a part of the first RAM 12.

Described now are the recording conditions and others. When the recording conditions, i.e., G sensor output value, exceed a threshold value of Gmax or Gmin, information recording is made to the CF card 11 for a recording time of 30 seconds at the maximum from the time point of threshold excess. The information includes JPEG conversion images endlessly recorded in the second SD-RAM, their G sensor output values, the information about position, time, vehicle's occupied/vacant status, and vehicle speed, and the audio information from the microphone 7. The time point of threshold excess is sometimes referred to as time point of trigger generation. The addition result of a recording time $T_{bef}$ before trigger generation and a recording time $T_{aft}$ after the trigger generation is the total recording time for an event. The recording time may be set to 30 seconds at the maximum, e.g., 5 seconds or longer but 25 seconds or shorter before the trigger generation, and 5 seconds or longer but 25 seconds or shorter after the trigger generation.

When the control device 2 receives an image capture request from the center device 4 as the recording conditions over the radio frequency, a first CPU (Central Processing Unit) 15 of the drive recorder main body 5 receives the signal as a command. In response, for the recording time of 30 seconds at the maximum from the time point of command reception TR2 (refer to as time point of trigger generation), the information recording is made to the CF card 11, i.e., the information includes JPEG conversion images endlessly recorded in the second SD-RAM, the G sensor output value at the time of command reception, the information about position, time, vehicle's occupied/vacant status, and vehicle speed, and the audio information from the microphone 7. The addition result of the recording time $T_{bef}$ before trigger generation and the recording time $T_{aft}$ after the trigger generation, i.e., $T_{bef}+T_{aft}$, is corresponding to the total recording time for an event. For example, after the speed of the vehicle 3 is determined based on the vehicle speed pulse that is a part of the driving schedule data, when the center device 4 determines that the resulting speed is higher than the stipulated speed limits, the center device 4 makes a request for image capture. Note here that the vehicle speed pulse is not the only parameter resulting from the trigger generation, and possibly, the center device 4 may make an image recording request based on at least any one specific driving schedule data, i.e., fixed-cycle recording, abrupt acceleration, abrupt deceleration, or abrupt steering. By using plurally such driving schedule data, the center device 4 can give a specific detailed drive guidance to the respective staff drivers.

Figure 3:
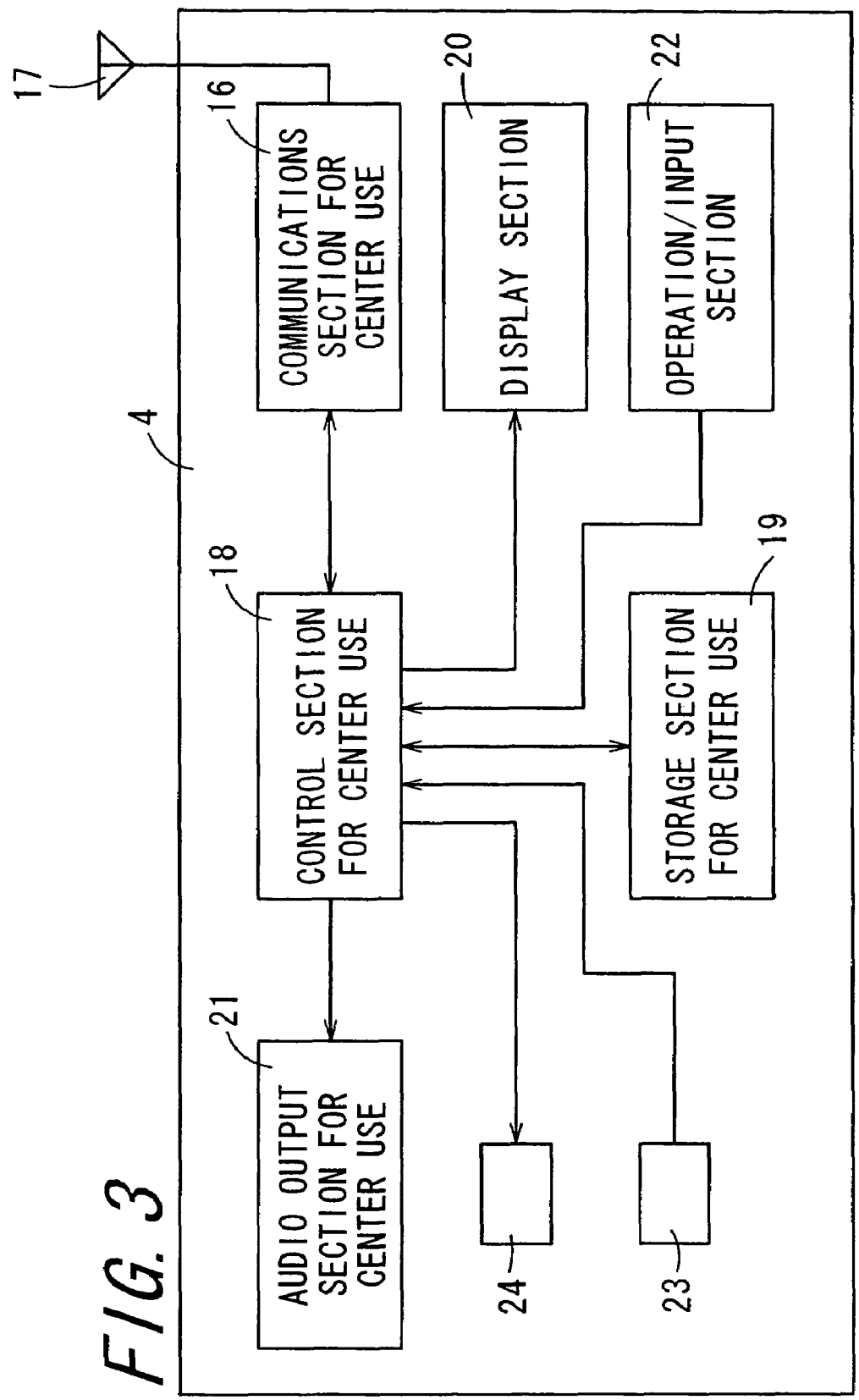
FIG. 3 is a block diagram showing the electronic configuration of the center device.
Figure 4:
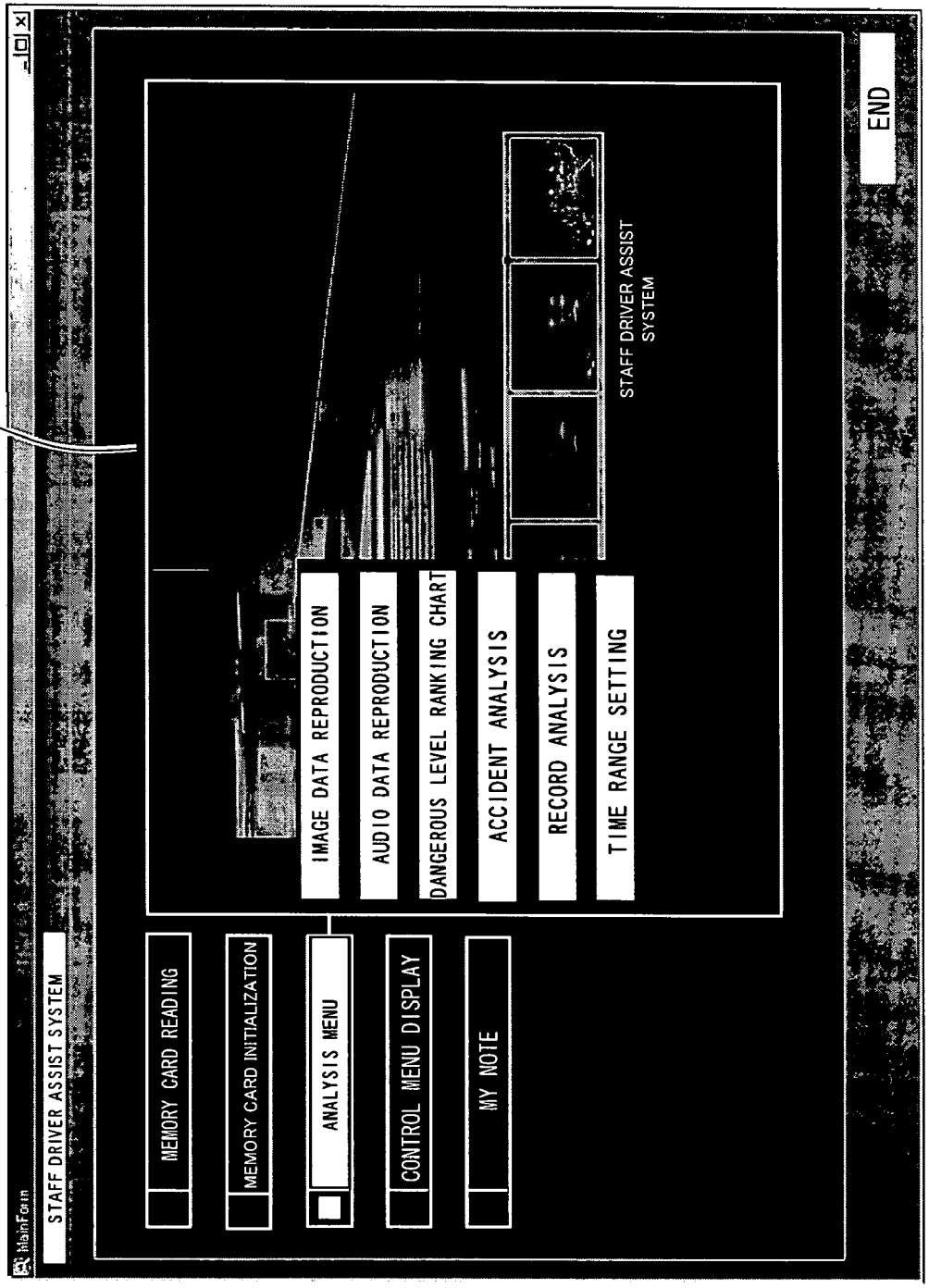
FIG. 4 is a diagram showing the main screen of the drive assist system.

FIG. 3 is a block diagram showing the electronic configuration of the center device 4. FIG. 4 is a diagram showing the main screen of the drive assist system. The center device 4 is configured to include a communications section 16 for the center use, an antenna 17 for the center use, a control section 18 for the center use, a storage section 19 for the center use (database: hereinafter, simply referred to as DB), a display section 20, an audio output section 21 for the center use, an operation section 22, a CF card reader 23 as a reading unit, and a printer 24 as an output unit. The control section 18 for the center use is implemented by a personal computer.

The communications section 16 receives information about the vehicle 3 coming from the control section 2 via the antenna 17. The information includes the position information, the time information, the vehicle information, the image information, and the audio information. The control section 18 makes the storage section 19 store therein the information received by the communications section 16. The control section 18 corresponding to the control unit makes at least either the display section 20 or the printer 24 display the image information and the map information stored in the storage section 19. The control section 18 also makes the audio output section 21 output the audio represented by the audio information stored in the storage section 19. The audio output section 21 here is implemented by a speaker. The control section 18 makes the communications section 16 forward, to the control section 2 via the antenna 17, the information input by the operation section 22. The control section 18 operates in accordance with the program contents of analysis software, and is corresponding to a CPU of a personal computer (sometimes referred to as PC), for example.

The CF card reader 23 is so figured as to be able to read the driving information recorded in the CF card 11 in response to the occurrence of an event relating to the vehicle 3. Thus read driving information is stored in the storage section 19 for a temporary basis, and then is compiled. Based on the driving information read by the CF card reader 23 and stored in the storage section 19, the control section 18 makes the display section 20 display a vehicle mark on a map, and a vehicle surrounding image corresponding to the position data of the vehicle 3 simultaneously with the vehicle mark. The vehicle mark indicates the position data of the vehicle 3 when the event is occurred.

FIG. 5 is a flowchart showing a PC data reading process from the CF card 11. When the center device 4 is turned on, the process is started. After the process is started, the procedure goes to step a1, and the control section 18 determines whether or not the CF card 11 is inserted into the CF card reader 23. With the determination of "NO", the procedure repeats step a1, and with the determination of "YES", the procedure goes to step a2. In step a2, the control section 18 reads data and information, i.e., driver staff data (drivers' names), image data, a G sensor output value, position data, time, vehicle's occupied/vacant status, vehicle speed, and audio information. Then in step a3, the control section 18 enters thus read data to the storage section 19, and constructs a database for every driver. The procedure then goes to step a4, and the control section 18 deletes the data in the CF card 11. After a notification of process completion is made in step a5, the process is ended.

That is to say, the startup of the PC on the center side is followed by a process of detecting whether or not the CF card 11 is inserted, and when it is detected that the CF card 11 is inserted, various data in the CF card 11 are once registered in the storage section 19 serving as a database. The data in the CF card 11 are deleted after the registration, and the user is notified of completion of the registration.

Figure 6C:
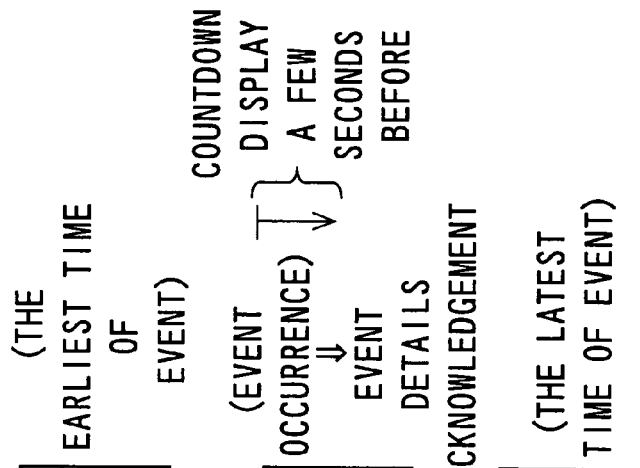
FIG. 6C is a diagram showing the details of data about the reproduction order.

FIGS. 6A and 6B are flowcharts showing an analysis process of the control section 18. FIG. 6C is a diagram showing the details of data about the reproduction order. When the center device 4 is turned on, the process is started. After the process is started, the procedure goes to step b1, and the control section 18 performs operation reading from the operation section, i.e., an analysis menu of FIG. 4. Here, by specifying the analysis menu of FIG. 4, various analysis results are displayed. The procedure then goes to step b2, and the control section 18 determines whether this is the time to execute an image reproduction process or not. With the determination of "NO", the procedure goes to step b11, and with the determination of "YES", the procedure goes to step b3. In step b3, the control section 18 performs data reading from the storage section 19, i.e., driver staff data (drivers' names), image data, a G sensor output value, position data, time, vehicle's occupied/vacant status, vehicle speed, and audio information.

Figure 7B:
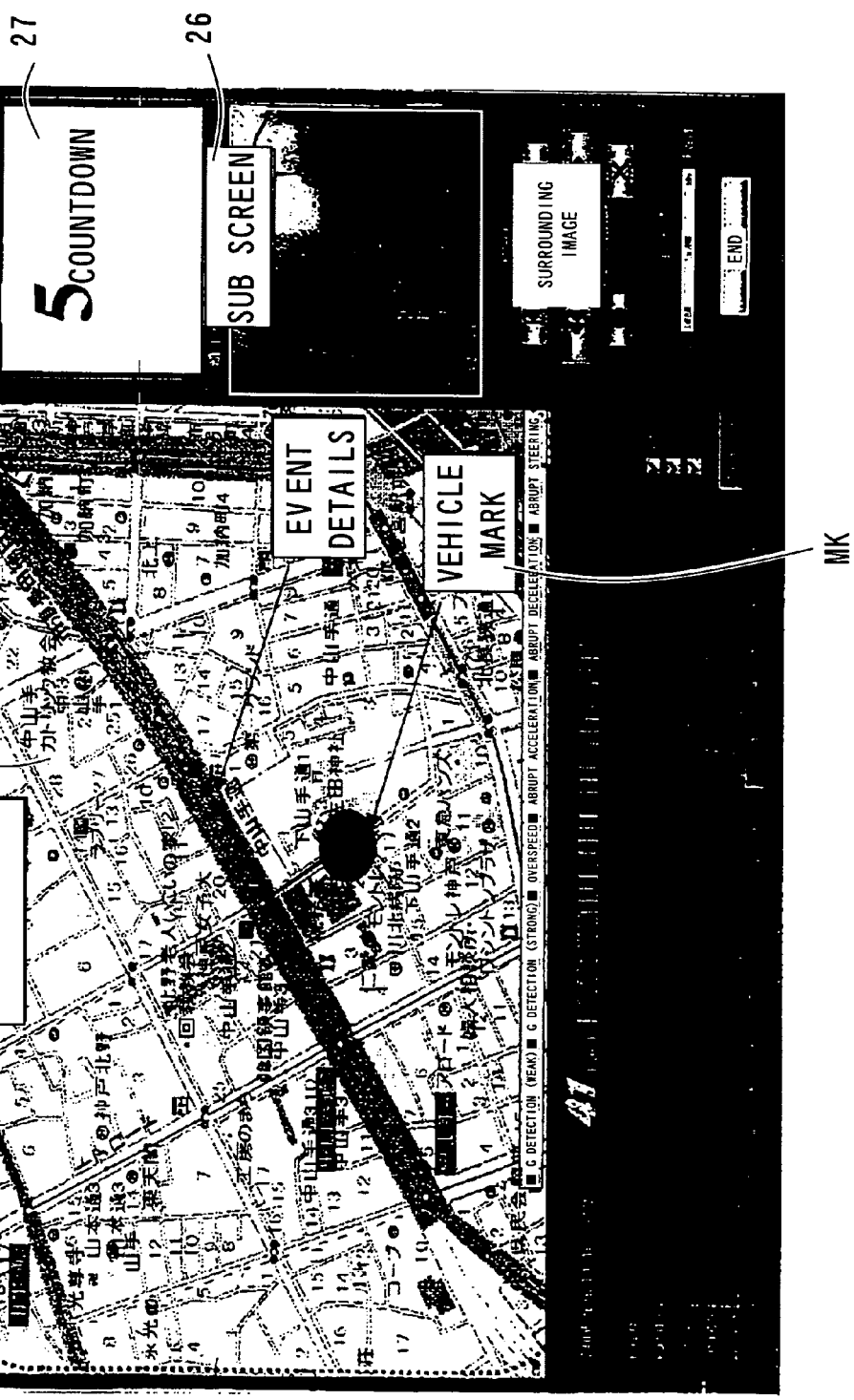

Then in step b4, the control section 18 disposes a vehicle mark MK on the map as shown in FIG. 7B based on the position data. The control section 18 reads the image data linked to the position data for display by the display section 20. The procedure then goes to step b5, and the control section 18 checks the type of the event based on the G sensor output value and the vehicle speed, and makes the display section display the mark (refer to FIG. 7B) indicating the event details at the position on the map observed with the event. Note here that such mark display is limitedly made when the map is specified on the main screen 25. That is to say, since the type of the event is checked by the control section 18, displayed on the map is the mark corresponding to the even details, for example, a red mark for G detection or an orange mark for harsh braking.

The procedure then goes to step b6, and the control section 18 determines whether a reproduction button Pb (refer to FIG. 7A) is operated or not. With the determination of "NO", the procedure returns to step b3, and with the determination of "YES", the procedure goes to step b7. Here, based on the position data and the time, the control section 18 moves the vehicle mark MK in time sequence on the map before the occurrence of the event for image reproduction and display. The control section 18 reproduces the image data in synchronization with the vehicle mark MK, for example, simultaneously. Then in step b8, the control section 18 reproduces and displays the G sensor output value, the vehicle speed SPD, and the audio in synchronization with the movement of the vehicle mark MK, for example, simultaneously as shown in FIGS. 7A and 7B. That is to say, the storage section 19 serving as a database links to each other the time (event time), position, image, G sensor value, vehicle speed, vehicle's occupied/vacant status, and audio information, which are stored in the storage section 19, so that data reproduction in a sequential order from the earliest time indicated by the time (event time) results in chronological reproduction on the map. The reproduction is thus performed sequentially from the earliest time before the event to the latest time after the event.

Then in step b9, the control section 18 determines whether it is a few seconds before the event. With the determination of "NO", the procedure returns to step b7, and with the determination of "YES", the procedure goes to step b10. In step b10, the control section 18 displays a countdown value, i.e., display 27 in FIG. 7B, superimposed on a personal information display area based on the time before the event. When the time reaches the event time, a corresponding mark is displayed.

Figure 11:
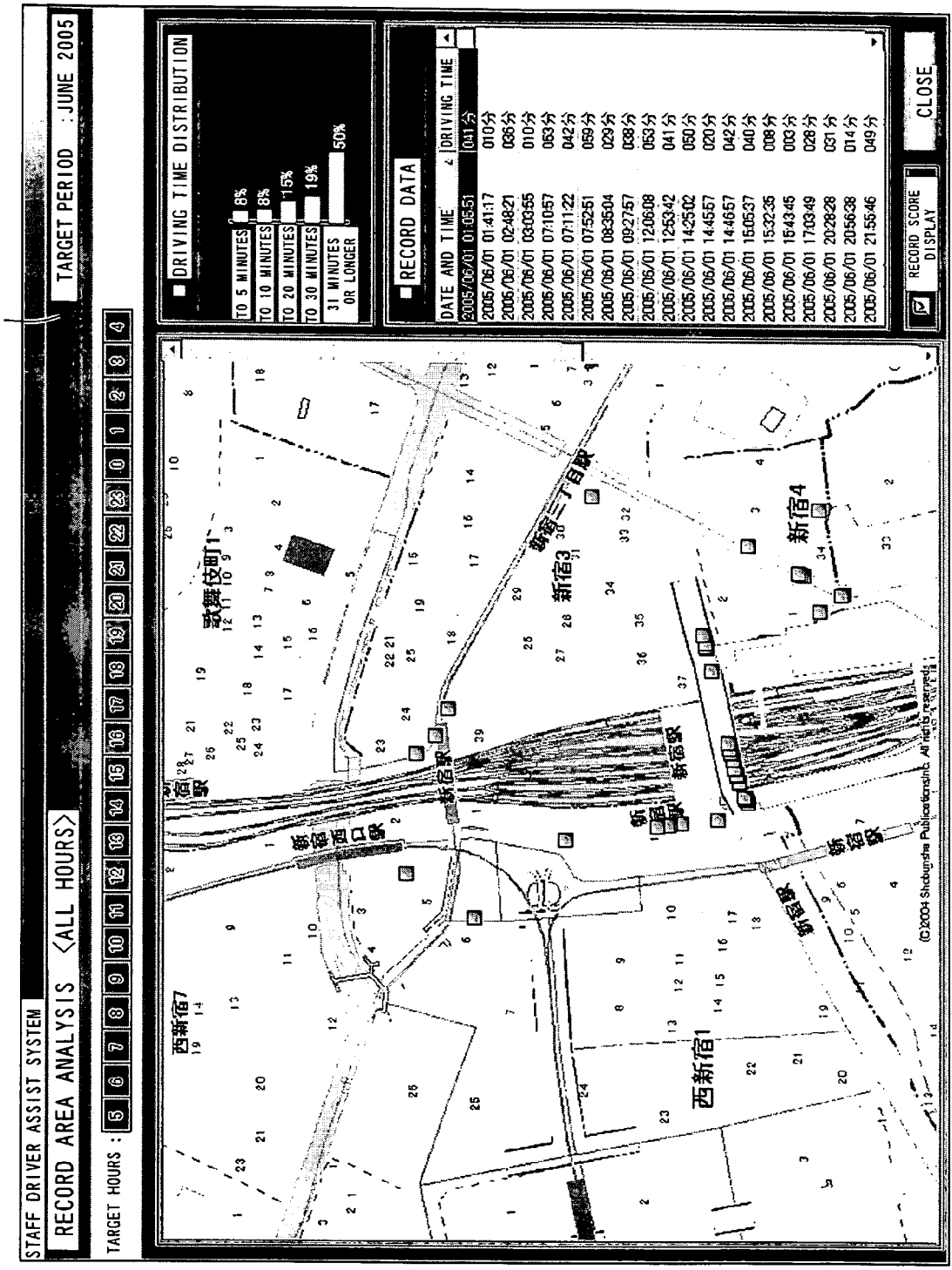
FIG. 11 is a diagram showing a record area analysis screen.

The procedure then goes to step S11, and the control section 18 determines whether this is the time to display a dangerous level ranking chart or not (refer to FIGS. 8 and 9) or not. With the determination of "NO", the procedure goes to step b13, and with the determination of "YES", the procedure goes to step S12. In step S12, the control section 18 displays, by ranks, a dangerous level for each of the drivers as shown in FIG. 9. The procedure then goes to step b13, and the control section 18 determines whether this is time to perform a record analysis or not as shown in FIG. 11. With the determination of "NO", the procedure goes to step b15, and with the determination of "YES", the procedure goes to step b14. In step b14, the control section 18 displays, based on the event, e.g., occupied status data (refer to FIG. 11), the position at the time of vehicle's occupied status on the map.

Figure 10:
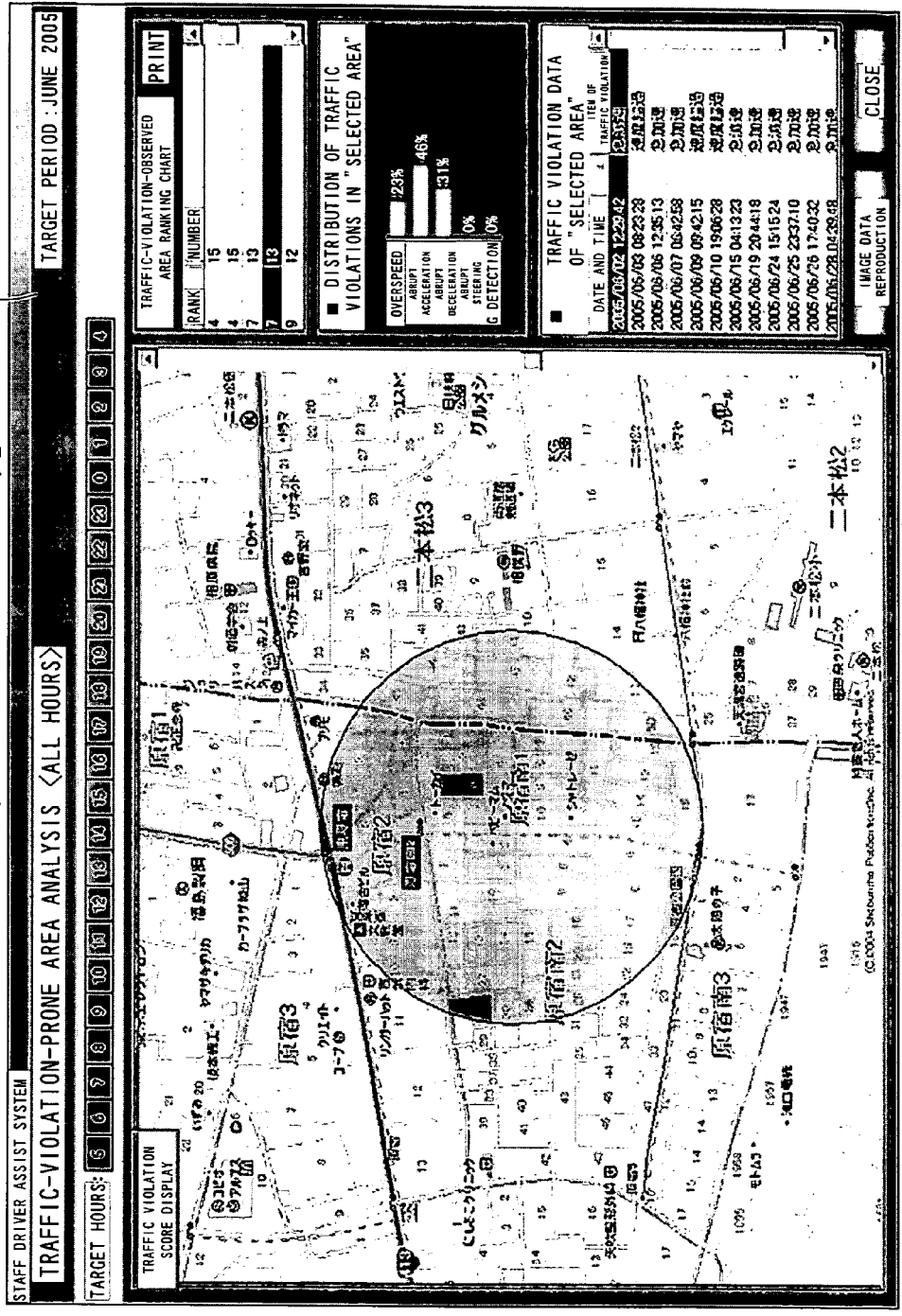
FIG. 10 is a diagram showing an analysis screen for a traffic-violation-prone area.

The procedure then goes to step b15, and the control section 18 determines whether this is time to perform a traffic violation analysis. With the determination of "NO", the procedure goes to step b17, and with the determination of "YES", the procedure goes to step b16. In step b16, as shown in FIGS. 10 and 11, the control section 18 makes the display section display the position of the vehicle at the time of the event occurrence on the map based on the event, e.g., G sensor, vehicle speed sensor, and others. Thereafter, the procedure goes to step b17 to return to the operation reading process.

Described now is the process in a case of data duplication.

When reading the data of the CF card 11 already entered in the storage section 19, the control section 18 is so configured as not to enter the data to the storage section 19 again. More in detail, at the time of reading the CF card, the control section 18 makes a data search, i.e., image data, audio data, driving schedule data (record of being occupied status, record of traffic violation) with key words of "vehicle number" and "date and time". Note here that, for the record of traffic violation, items of traffic violation are added for use as keywords. When finding any needed data, the control section 18 does not enter the data into the storage section 19 in a case that it is already entered therein. In a case that the data is not yet entered in the storage section 18, the control section 18 enters the data therein.

FIGS. 7A and 7B are diagrams showing an image data reproduction screen. Specifically, FIG. 7A is a diagram showing both a main screen 25 and a sub screen 26 simultaneously, and FIG. 7B is a diagram showing, corresponding to the position information at the time of event occurrence, the countdown display 27 together with the details of the event on a map. The control section 18 makes the display section 20 display thereon both the main screen 25 and the sub screen 26 simultaneously. The sub screen 26 is smaller in display region than the main screen 25. The control section 18 makes the main screen 25 display thereon the vehicle mark MK, and the sub screen 26 display, on the map, the event details corresponding to the position information at the time of event occurrence together with the surrounding screen of the vehicle 3. When the map is specified on the sub screen 26, the map is displayed small. Therefore, the event details are displayed only when the map is specified on the main screen 25.

The control section 18 has a function of making the display section 20 display thereon the countdown display 27 before the occurrence of an event. As shown in FIG. 7B, in the vicinity of the sub screen 26 in the display section 20, "5" is displayed to represent that it is 5 seconds before the event occurrence. Thereafter, this display 27 is sequentially changed in display on a second basis, e.g., "4", "3", "2", and "1". Together therewith, the map displays thereon the event details corresponding to the position information.

Figure 8:
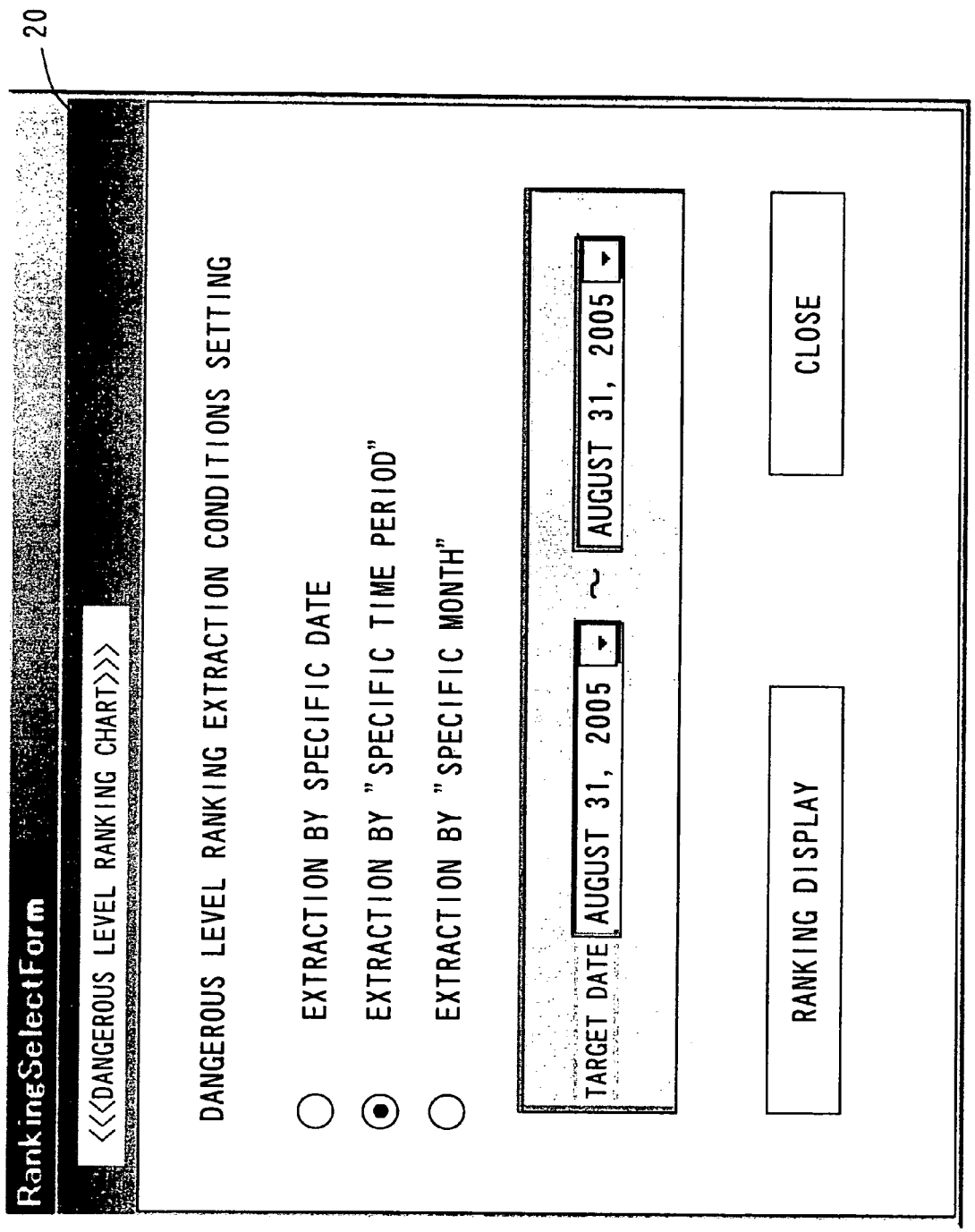
FIG. 8 is a diagram showing a setting screen of a target period for the dangerous level ranking chart.

FIG. 8 is a diagram showing a setting screen of a target period for the dangerous level ranking chart. The dangerous level ranking chart means arranging the drivers in descending order (from good to bad) of scores, i.e., evaluation scores. FIG. 9 is a diagram showing a screen of the dangerous level ranking chart. For each of the drivers, the display section 20 reads the driving information, i.e., the dangerous driving information being the event, from the CF card 11, and displays the details of the dangerous driving information to show his or her driving tendencies. The extraction conditions for the dangerous level ranking are firstly defined by any one of a specific date, a specific time period (first and last dates), and a specific month. In FIG. 8, the specific time period is selected for the extraction conditions. The extraction conditions can be changed through operation of the operation section 22.

The items of traffic violation include overspeed, abrupt acceleration, harsh braking, abrupt steering, and G detection corresponding to a collision level. For the extraction conditions, every item of traffic violation is defined by an evaluation score for weight assignment, e.g., 1 to 10 scores, and 1 to 100 scores only for G detection. At the time of screen activation, the lastly-selected scores are displayed, and at the time of initial activation, "G detection" is displayed with "30" scores, and any other items are each displayed with "5 scores".

A dangerous score is displayed with a value calculated by multiplying the frequency of traffic violation by a score of the traffic violation, and then by a coefficient for the time range of the traffic violation. Exemplified here is a case with a weighting score "5" for overspeed, 5 times overspeed early in the morning or late at night, i.e., coefficient of 2.00, and 10 times overspeed in the busy hours, i.e., coefficient of 0.50. In this case, the dangerous score to be displayed will be ((5×5)× 2.00)+((5×10)×0.50=75 scores. Herein, the number is rounded off at the first decimal place. When the time of traffic violation falls in a plurality of time ranges, the calculation is performed with the time range whose coefficient is the highest in value. When the time of traffic violation falls in no time range, the calculation is to be performed using the coefficient of "1.00".

A display area of traffic violation frequency is displayed with the total frequency of traffic violation. A display area of driving tendencies is displayed with "item of traffic violation with the highest frequency" and "frequency of G detection". Note here that the frequency of G detection is displayed only when the detection is actually made. When the item of traffic violation with the highest frequency is plurally found, the item selection is made, for display, in order of "G detection", "abrupt steering", "harsh braking", "abrupt acceleration", and "overspeed".

FIG. 10 is a diagram showing an analysis screen for a traffic-violation-prone area. FIG. 11 is a diagram showing a record area analysis screen. For a process of area analysis, the area analysis is performed in the following process procedure. Although exemplified below is a traffic-violation-prone area, the record area is subjected to the similar process procedure. Described now is the analysis process in a simple mode. First of all, a mesh area (500 m×500 m) in which traffic violation data is frequently generated is extracted from the data base. Next, in the mesh area in which traffic violation data is frequently generated as such, top-ranked 50 data for the mesh area and therearound is extracted from the storage section 19 as area extraction target data. From each of thus extracted area extraction target data, a potential area *1 is extracted based on the process flow in the next page. The potential area *1 means a circular area around a point, which is located north by about a radius of the analysis area from the position of the area extraction target data. Thereafter, top-ranked 20 potential areas are determined as being traffic-violation-prone areas, and these areas are displayed and expanded on the analysis screen. For such traffic violation analysis and record analysis, either the area display or the score display is available by selection.

FIG. 12 is a diagram showing a time range setting screen. The display section 20 has a function of displaying the dangerous driving information or the occupied status information only for a predetermined time range. As setting items, the title for a time range, e.g., "e.g., early-morning or late-night" can be input, and the time-related reason of traffic violation, e.g., "e.g., drowsiness in early-morning and late-night" can be input. The setting item of time range is made selectable, e.g., "0:00 to 23:00". The starting time of this time range is selected from the starting times prepared by environment settings. As a setting item, the dangerous score on the screen of the dangerous level ranking chart can be input for use as a coefficient of calculation. The setting range is "0.01" to "9.99", for example, and a default value is "1.00".

Figure 13:
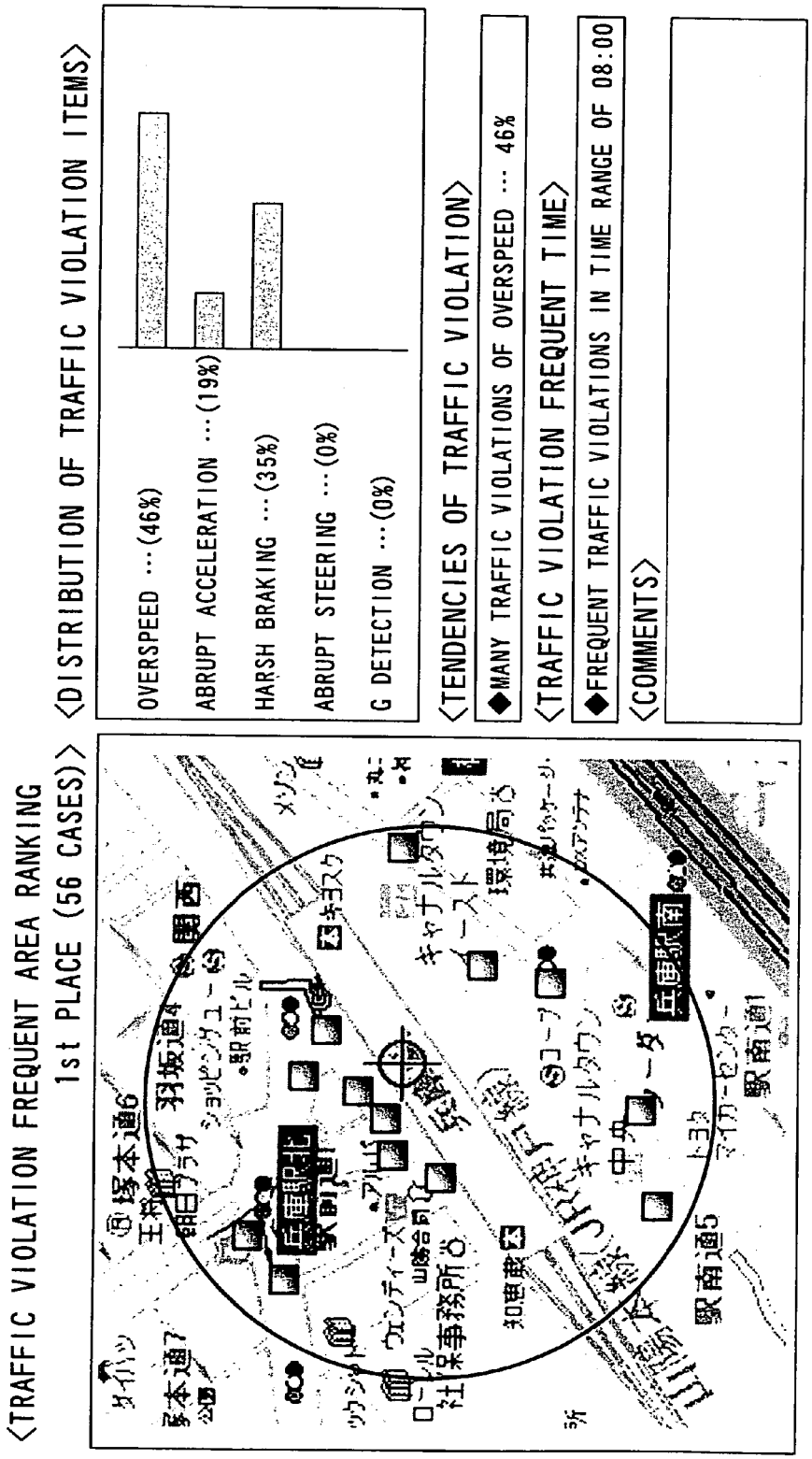
FIG. 13 is a diagram showing a record area file for busy hours.

FIG. 13 is a diagram showing a record area file for busy hours. The control section 18 exercises control over the printer 24 to output a map of traffic violation scores for the traffic-violation-prone area (black, hollow circle). The recording paper shows the date range analyzed as the target period together with the analyzed staff driver information. The paper also shows the ranking of the traffic-violation-prone areas together with the number of traffic violations therein. To show the distribution of the items of traffic violation, displayed is a traffic violation item distribution graph for the traffic-violation-prone areas. The items of analysis include overspeed, abrupt acceleration, harsh braking, abrupt steering, G detection, and others. For the distribution of the traffic violation items, displayed are the item of traffic violation most frequently observed in each of the traffic-violation-prone areas, and the frequency ratio thereof. When the item of traffic violation with the highest frequency is plurally found, the item selection is made, for display, in order of "G detection", "abrupt steering", "harsh braking", "abrupt acceleration", and "overspeed". A display area of the time of frequent traffic violations is displayed with the time at which traffic violations are observed with the highest frequency.

Figure 14:
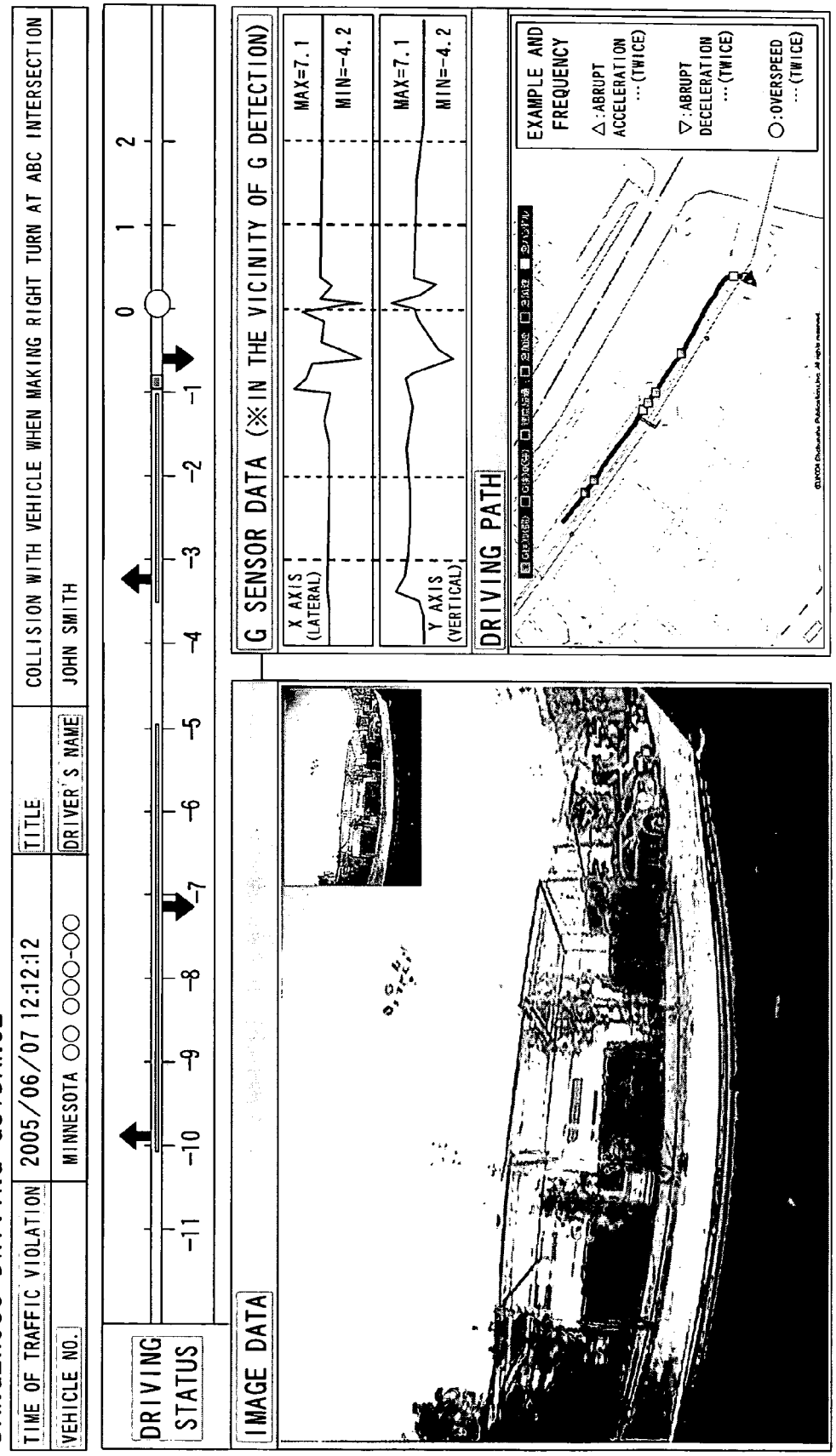
FIG. 14 is a diagram showing a dangerous driving guidance.

FIG. 14 is a diagram showing a dangerous driving guidance. The control section 18 exercises control over the printer 24 to output the dangerous driving guidance. The recording paper shows the date and time when the G detection is made as the traffic violation observed time together with the driver's name, and others. The recording paper also shows a graph of the driving information during the image recording. Herein, the G detection position is indicated by a circle, and when the vehicle drives at the speed higher than the predetermined speed, the lateral line is displayed with emphasis. When the traffic violation of abrupt acceleration is observed, an up-arrow is displayed, and when the traffic violation of abrupt deceleration is observed, a down-arrow is displayed. When the traffic violation of abrupt steering is observed, a square mark is displayed.

When images of the option cameras 6A and 6B are displayed on the image data reproduction screen displaying the image data, the image data remains displayed. G sensor data is displayed in graphs each with X values and Y values, i.e., 4 seconds before detection, and 2 seconds after detection. The driving path is displayed on the map, i.e., the driving path during the image recording and information about traffic violation. The exemplary items of traffic violation displayed on the screen are overspeed, abrupt acceleration, harsh braking, abrupt steering, G detection, and traffic violation frequency. The driving path covers the entire path of 30 seconds' driving.

According to the driving information analysis apparatus described above, based on the driving information read by the CF card reader 23, the vehicle mark is displayed on the map to indicate the position information of the vehicle 3 corresponding to the occurrence of the event, and in synchronization with, for example, simultaneously with the vehicle mark, the surrounding image of the vehicle 3 corresponding to the position information is displayed on the display section 20. Such displays favorably assist to analyze what situation occurs where so that the analysis results can be easily checked. As such, the driving information analysis apparatus can serve well to assist drivers' safe driving.

The display section 20 displays, on the map, the details of the event corresponding to the position information at the time of event occurrence. This accordingly eases to understand what situation occurs where so that the analysis can be performed with more ease. Moreover, the vehicle mark MK is displayed on the main screen 25, and when the surrounding image of the vehicle 3 is displayed on the sub screen 26, the details of the event corresponding to the position information are displayed on the map. This allows to display large the map on the main screen 25, thereby making portions segmented for every event details easy to see, and increasing the efficiency of a rendering process.

The display section 20 is made to display the countdown display 27 before the occurrence of the event. It is thus possible to recognize that the event will occur after a predetermined time. At a predetermined time before a point of time when the event will occur, the screen is switched from the normal display to the countdown display. The analysis can be thus performed with the easy-to-see display with no need to always reserve in advance a space for the countdown display. Moreover, for each of the drivers, the dangerous driving information being the event is read from the CF card 11, and the details of the dangerous driving information are displayed to show his or her driving tendencies. This enables to teach and guide the drivers to stop driving dangerously as they tend to do, thereby serving well to assist drivers' safe driving.

The driving information, i.e., the driver's occupied status information being the event, is displayed on the map corresponding to the position information. This accordingly helps a manager perform vehicle allocation with efficiency. What is more, the driver-oriented vehicle allocation, i.e., for a specific area, a driver familiar with the area is allocated with a priority, will make the driver feel easy to drive so that he or she will stop driving dangerously. As such, the driving information analysis apparatus can serve well to assist drivers' safe driving. Further, the driving information, i.e., the details of the dangerous driving information being the event, is displayed on the map corresponding to the position information. The drivers thus can drive while making a detour to avoid the position or being cautious of the position, or be taught and guided to do so. Still further, the dangerous driving information or the occupied status information can be displayed only for a predetermined time range, thereby helping understand how often the dangerous driving information appears in which time range.

In this embodiment, exemplified is a case of performing recording and reproduction on the center side. The center side is not surely restrictive, and the recording and reproduction can be performed on the side of a monitor, i.e., navigation system, equipped in the vehicle. With this being the case, images recorded in the CF card 11 and their corresponding positions may be read, and using the map installed in the navigation system equipped in the vehicle, the monitor may display the pervious positions of the vehicle with marks, and surrounding images corresponding to the positions in synchronization with, for example, at the same time with the movement of the marks. Note here that, for safety, such reproduction display is to be made only when the vehicle is stopped.

As such, the invention is surely applicable not only to taxies but also to general users so that any memory video can be reproduced in their vehicles. What is more, a driver's CF card may be reproduced in other drivers' vehicles to teach and guide any route difficult to find or follow or any dangerous locations and areas.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A driving information analysis apparatus configured to read, from a recording medium, driving information covering a period before and after occurrence of an event and analyzes the driving information, the driving information analysis apparatus comprising:
   a control unit configured to make a display section simultaneously display a vehicle mark on a map to indicate vehicle position information at a time of occurrence of the event and a vehicle surrounding image corresponding to the vehicle position information at the time of occurrence of the event based on the driving information read by a reading unit configured to read the driving information recorded in the recording medium.

2. The driving information analysis apparatus of claim 1, wherein the control unit makes the display section display, on the map, details of the event corresponding to the vehicle position information at a time of occurrence of the event.

3. The driving information analysis apparatus of claim 2, wherein the control unit makes the display section simultaneously display a main screen and a sub screen which is smaller than the main screen, wherein the main screen displays the vehicle mark, and the sub screen displays, on the map, details of the event corresponding to the vehicle position information together with the vehicle surrounding image.

4. The driving information analysis apparatus of claim 1, wherein, based on the driving information covering the period before and after the occurrence of the event, the control unit makes the display section display the vehicle mark on the map in the period before and after the occurrence of the event, and the vehicle surrounding image simultaneously with the vehicle mark.

5. The driving information analysis apparatus of claim 4, wherein the control unit makes the display section display a countdown display before the occurrence of the event.

6. The driving information analysis apparatus of claim 1, wherein, based on dangerous driving information and driver information included in the driving information, the control unit makes the display section display details of the dangerous driving information, which are frequently caused by each driver.

7. The driving information analysis apparatus of claim 1, wherein the control unit makes the display section display, on the map, driver's with-passenger information included in the driving information, corresponding to the vehicle position information.

8. The driving information analysis apparatus of claim 1, wherein the control unit makes the display section display, on the map, details of the dangerous driving information included in the driving information, corresponding to the vehicle position information.

9. The driving information analysis apparatus of any one of claims 6 to 8, wherein the control unit makes the display section display the dangerous driving information or the with-passenger information only for a predetermined time range.

10. A driving information analysis system configured to reads, from a recording medium, driving information covering a period before and after occurrence of an event, and analyzes the driving information, the driving information analysis system comprising:
    a computer including an input unit, a computation unit, and an output unit,
    wherein the computer is configured to make a display section simultaneously display a vehicle mark on a map to indicate vehicle position information at a time of occurrence of the event and a vehicle surrounding image corresponding to the vehicle position information at the time of occurrence of the event based on the driving information read by a reading unit configured to read the driving information recorded in the recording medium.

11. A driving information analysis apparatus configured to read, from a recording medium, driving information covering a period before and after occurrence of an event, and analyze the driving information, the driving information analysis apparatus comprising:
    a reading unit configured to read the driving information recorded in the recording medium;
    a display section configured to display various pieces of information thereon;
    a storage section configured to store map information and the driving information therein; and
    a control unit configured to makes the display section simultaneously display a vehicle mark on a map to indicate vehicle position information at a time of occurrence of the event and a vehicle surrounding image corresponding to the vehicle position information at a time of occurrence of the event based on the driving information.

* * * * *